(12) United States Patent
Tanaka et al.

(10) Patent No.: US 6,385,720 B1
(45) Date of Patent: May 7, 2002

(54) BRANCH PREDICTION METHOD AND PROCESSOR USING ORIGIN INFORMATION, RELATIVE POSITION INFORMATION AND HISTORY INFORMATION

(75) Inventors: Tetsuya Tanaka, Ibaraki; Takao Yamamoto, Hirakata, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/114,274

(22) Filed: Jul. 13, 1998

(30) Foreign Application Priority Data

Jul. 14, 1997 (JP) .............................................. 9-188346

(51) Int. Cl.[7] .............................................. G06F 15/00
(52) U.S. Cl. ...................................... 712/240; 712/213
(58) Field of Search ................................ 712/213, 233, 712/240, 239, 241

(56) References Cited

U.S. PATENT DOCUMENTS

| 4,954,947 | A | * | 9/1990 | Kuriyama et al. | ............ | 712/218 |
| 5,367,703 | A | * | 11/1994 | Levitan | .................. | 712/800.01 |
| 5,812,838 | A | * | 9/1998 | Dhong et al. | ................ | 712/239 |
| 5,822,576 | A | * | 10/1998 | Dinkjian et al. | ............. | 712/239 |
| 5,951,679 | A | * | 9/1999 | Anderson et al. | ............ | 712/241 |
| 5,978,909 | A | * | 11/1999 | Lempel | ........................ | 712/240 |

FOREIGN PATENT DOCUMENTS

| JP | 6049340 | 4/1982 |
| JP | 5143334 | 6/1993 |

OTHER PUBLICATIONS

Japanese Office Action dated Mar. 2, 1999, Patent Appln. No. Hei 10–190003, Feb. 17, 1999 and English translation.
Hara, et al., "Instruction Supply Mechanism in the SIMP Processor Prototype," vol. 90, No. 7 (90–ARC–80), Jan. 1990, pp. 49–56.
Japanese Office Action dated Nov. 17, 1998 and English translation.

\* cited by examiner

*Primary Examiner*—Eddie Chan
(74) *Attorney, Agent, or Firm*—Stevens, Davis, Miller & Mosher, LLP

(57) ABSTRACT

In branch prediction in accordance with the present invention, in order to reduce the storage capacity for storing branch prediction information and simplify an information retrieval circuit while minimizing reduction in branch prediction accuracy, the position of an instruction is stored in advance and an instruction is decoded for execution, the relative position of the instruction decoded for execution is obtained on the basis of the position of the stored instruction, and when the decoded instruction is a branch instruction the result of branch by the branch instruction is recorded as history information in correspondence with the relative position of the branch instruction. After this, an instruction is pre-decoded before execution, the relative position of the pre-decoded instruction is obtained on the basis of the position of the stored instruction, when the pre-decoded instruction is a branch instruction the history information corresponding to the relative position of the pre-decoded branch instruction is referred to, and the result of the execution of the pre-decoded branch instruction is predicted by using the result of the reference to the history information.

2 Claims, 8 Drawing Sheets

Fig. 5

Loop head address

□ ⇐ The result of the execution of the first branch instruction from the head of the loop □ ⇐ The result of the execution of the second branch instruction from the head of the loop □ ⇐ The result of the execution of the third branch instruction from the head of the loop □ ⇐ The result of the execution of the fourth branch instruction from the head of the loop

Fig. 6

| Address A | ☐ | ⇐ The result of the execution of the branch instruction at address A | addressB
−addressA ☐ ☐ ⇐ The result of the execution of the branch instruction at address B addressC
−addressA ☐ ☐ ⇐ The result of the execution of the branch instruction at address C addressD
−addressA ☐ ☐ ⇐ The result of the execution of the branch instruction at address D Fig. 8
PRIOR ART

| Address A | ☐ | ⇐ The result of the execution of the branch instruction at address A |
| Address B | ☐ | ⇐ The result of the execution of the branch instruction at address B |
| Address C | ☐ | ⇐ The result of the execution of the branch instruction at address C |
| Address D | ☐ | ⇐ The result of the execution of the branch instruction at address D |

BRANCH PREDICTION METHOD AND PROCESSOR USING ORIGIN INFORMATION, RELATIVE POSITION INFORMATION AND HISTORY INFORMATION

BACKGROUND OF THE INVENTION

1. Field of the Invention

The present invention particularly relates to a branch prediction method and a processor for pre-decoding a branch instruction, for predicting the result of branch, and for reading an instruction in advance located at the destination of the branch, thereby lessening performance reduction due to a delay in instruction reading by the branch instruction when the prediction has turned out right at the time of actual execution of the branch instruction.

2. Description of the Related Art

Apparatuses incorporating processors have recently become widespread in various fields in accordance with the progress of computer technology. Such a processor may include a branch prediction device to reduce hazards due to branch instructions. A processor including a conventional branch prediction device pre-decodes an instruction before execution, and predicts the result of branch when the instruction is a branch instruction, and then reads the instruction located at the destination of the branch on the basis of the result of the execution of the branch instruction.

The method of branch prediction can be classified into static branch prediction and dynamic branch prediction. In the static branch prediction, branch taken or not taken is determined in advance by hardware. For example, it is possible to determine that all branches are not taken at all times. In this case, when the ratio of branch not taken is high, the effect of the prediction is raised. However, when the ratio of branch taken is high, the opposite effect occurs. As another example of the method, it is determined that branch is taken for backward branch, and branch is not taken for forward branch. This method is referred to as the BTFN (Backward branch Taken, Forward branch Not Taken) method. Since backward branch forms a loop, it is possible to assume that branch is taken in most cases. For this reason, it is possible to predict backward branch highly accurately. However, the prediction of forward branch may not be effective just as in the case of the example described above.

In order to solve these problems associated with the static branch prediction, dynamic branch prediction is used. In the dynamic branch prediction, the result of the execution of each branch instruction is stored as history information and used for the next branch prediction. FIG. 8 shows a conceptual view of the dynamic branch prediction. As shown in FIG. 8, in order to carry out the dynamic branch prediction, a table wherein one entry comprises the absolute address of a branch instruction and branch result information ("1" when branch is taken, "0" when branch is not taken, for example) is required as information for branch prediction. When a branch instruction is executed, the address of the instruction and the result of the execution are recorded in an entry. When the branch instruction located at the same address is pre-decoded next, the address is used to retrieve the corresponding entry, and branch prediction is carried out referring to the recorded branch result information. When branch taken is predicted by branch prediction, the instruction located at the destination of branch is read from the memory in which the instruction is stored. When branch not taken is predicted by branch prediction, the next instruction is read from the memory. Furthermore, if the result of branch coincides with the result of prediction when the same branch instruction is executed, the instruction read in advance from the memory by the prediction is executed. At this time, the delay required when the instruction located at the destination of branch is read from the memory can be lessened since the instruction has been read in advance. FIG. 8 conceptually shows addresses A to D, and the information on the result of the execution of the branch instructions corresponding to the addresses A to D.

As described above, the result of branch can be predicted for each branch instruction by the conventional dynamic branch prediction. Since the result obtained the last time (older information may be included) is used for prediction, the accuracy of branch prediction can be raised. In this case, a table for storing the addresses of branch instructions and result information, and a means for retrieving a necessary entry are required.

However, since an address is stored for each branch instruction in the conventional dynamic branch prediction, a large storage capacity is required for branch prediction. In addition since the corresponding branch instruction information is required to be retrieved quickly, an address comparison means is required for each entry. These are problems associated with the conventional branch prediction. Furthermore, it is usually required to deal with as many branch instructions as possible in order to raise the effect of branch prediction. To accomplish this, the number of the entries in the table is increased (usually, 512 to 1024). In this case, the above-mentioned problems become more serious.

SUMMARY OF THE INVENTION

An object of the present invention is to provide a branch prediction method which can reduce the storage capacity for storing branch prediction information and can simplify an information retrieval circuit while reduction in branch prediction accuracy is minimized.

Another object of the present invention is to provide a processor having a branch prediction device which can reduce the storage capacity for storing branch prediction information and can simplify an information retrieval circuit while reduction in branch prediction accuracy is minimized.

To attain the objects, the branch prediction method of the present invention comprises a first step wherein the result of branch by a branch instruction is recorded as history information in correspondence with the relative position of the instruction from an origin, and a second step wherein the result of branch by the next branch instruction is predicted by referring to the history information on the basis of the relative position of a pre-decoded instruction from the origin when the next branch instruction is pre-decoded before execution.

In this case, the first step comprises an origin position storing step for storing the position of the instruction located at the origin, an execution decoding step for decoding an instruction for execution, an instruction position obtaining step for obtaining the relative position of the instruction decoded for execution on the basis of the position of the instruction stored by the origin position storing step, and a history recording step for recording the result of branch by a branch instruction as history information in correspondence with the relative position of the branch instruction when the decoded instruction is a branch instruction.

Furthermore, the second step comprises a pre-decoding step for pre-decoding the instruction before the instruction is executed next time, a preceding instruction position obtaining step for obtaining the relative position of the pre-decoded instruction on the basis of the position of the instruction stored by the origin position storing step, a history reference step for referring to the history information corresponding to the relative position of the pre-decoded branch instruction when the pre-decoded instruction is a branch instruction, and a prediction step for predicting the result of the execution of the pre-decoded instruction by using the result of the reference to the history information.

Furthermore, the above-mentioned origin position storing step is a step for storing the address of the instruction to be executed, which is located at the origin, for example. More specifically, the origin position storing step comprises a loop detection step for detecting a loop structure in the program, and a step for fetching and storing the address of the instruction located at the head of the loop on the basis of the loop structure of the program detected by the loop detection step, for example. The above-mentioned loop detection step is a step for detecting the loop structure of the program by decoding a backward branch instruction, for example.

Instead of the above-mentioned configuration, the above-mentioned origin position storing step may comprise a block head address detection step for detecting the head address of a program block, and a block head address storing step for storing the address detected by the block head address detection step, for example.

The above-mentioned instruction position obtaining step comprises a step for obtaining the number of instructions by counting the number of the instructions decoded for execution, for example. In correspondence with this, the preceding instruction position obtaining step comprises a step for obtaining the number of instructions by counting the pre-decoded instructions.

Furthermore, instead of the above-mentioned configuration, the instruction position obtaining step may comprise a step for obtaining the number of instructions by counting the number of the instructions found to be branch instructions by decoding for execution, for example. In correspondence with this, the preceding instruction position obtaining step may comprise a step for obtaining the number of instructions by counting the instructions found to be branch instructions by pre-decoding.

Furthermore, instead of the above-mentioned configuration, the instruction position obtaining step may comprise a step for obtaining the difference between the address of the instruction decoded for execution and the address stored by the origin position storing step, for example. In correspondence with this, the preceding instruction position obtaining step may comprise a step for obtaining the difference between the address of the pre-decoded instruction and the address stored by the origin position storing step.

The above-mentioned history recording step may be a step for recording plural pieces of history information.

With the branch prediction method of the present invention, history information is recorded in correspondence with the relative position of a branch instruction from the origin on the basis of the result of branch, and at the execution time of the next branch instruction the history information is referred to on the basis of the relative position of the pre-decoded instruction from the origin to predict the result of branch by the branch instruction. Therefore, the result of branch by a plurality of branch instructions can be predicted by using only the origin information, the relative position information and the history information as the branch prediction information required for branch prediction. In comparison with the amount of information in the conventional method wherein absolute addresses and history information are stored for each branch instruction, the amount of information in the present embodiment wherein the origin information, the relative position information for each branch instruction and the history information are stored can be reduced, whereby the capacity of the memory for storing the branch prediction information can be made smaller than that required by the conventional method.

Furthermore, in the conventional configuration wherein the address of each branch instruction is stored, and at each issue of a branch instruction a branch instruction corresponding to the issued branch instruction is retrieved, a retrieval circuit having a plurality of comparators is required to compare the address of the branch instruction with all the stored addresses. However, in the case of the branch prediction method of the present invention, the amount of a relative position information (relative address values, for example) is less than the amount of address information. Consequently, the comparator and the retrieval circuit can be made smaller in size, and low power consumption can be attained.

Furthermore, the processor of the present invention comprises a first means wherein the result of branch by a branch instruction is recorded as history information in correspondence with the relative position of the instruction from an origin, and a second means wherein the result of branch by the next branch instruction is predicted by referring to the history information on the basis of the relative position of the pre-decoded instruction from the origin when the next branch instruction is pre-decoded before execution.

In this case, the first means comprises an origin position storing means for storing the position of the instruction located at the origin, an execution decoding means for decoding an instruction for execution, an instruction position obtaining means for obtaining the relative position of the instruction decoded for execution on the basis of the position of the instruction stored by the start point storing means, and a history recording means for recording the result of branch by a branch instruction as history information in correspondence with the relative position of the branch instruction when the decoded instruction is a branch instruction.

Furthermore, the second means comprises a pre-decoding means for pre-decoding the instruction before the instruction is executed next time, a preceding instruction position obtaining means for obtaining the relative position of the pre-decoded instruction on the basis of the position of the instruction stored by the origin position storing means, a history reference means for referring to the history information corresponding to the relative position of the pre-decoded branch instruction when the pre-decoded instruction is a branch instruction, and a branch prediction means for predicting the result of the execution of the pre-decoded instruction by using the result of the reference to the history information.

Furthermore, the above-mentioned origin position storing means is a means for storing the address of the instruction to be executed, which is located at the origin, for example. More specifically, the origin position storing means comprises a loop detection means for detecting a loop structure in the program, and a means for fetching and storing the address of the instruction located at the head of the loop on the basis of the loop structure of the program detected by the loop detection means, for example. The above-mentioned loop detection means is a means for detecting the loop structure of the program by decoding a backward branch instruction, for example.

Instead of the above-mentioned configuration, the origin position storing means may comprise a block head address detection means for detecting the head address of a program block, and a block head address storing means for storing the address detected by the block head address detection means, for example.

The above-mentioned instruction position obtaining means comprises a means for obtaining the number of instructions by counting the number of the instructions decoded for execution, for example. In correspondence with this, the preceding instruction position obtaining means comprises a means for obtaining the number of instructions by counting the pre-decoded instructions.

Furthermore, instead of the above-mentioned configuration, the instruction position obtaining means may comprise a means for obtaining the number of instructions by counting the number of the instructions found to be branch instructions by decoding for execution, for example. In correspondence with this, the preceding instruction position obtaining means may comprise a means for obtaining the number of instructions by counting the instructions found to be branch instructions by pre-decoding.

Furthermore, instead of the above-mentioned configuration, the instruction position obtaining means may comprise a means for obtaining the difference between the address of the instruction decoded for execution and the address stored by the origin position storing means, for example. In correspondence with this, the preceding instruction position obtaining means may comprise a means for obtaining the difference between the address of the pre-decoded instruction and the address stored by the origin position storing means.

The history recording means may be a means for recording plural pieces of history information, for example.

The processor of the present invention has means for recording history information in correspondence with the relative position of a branch instruction from the origin, for referring to the history information on the basis of the relative position of the pre-decoded instruction from the origin at the execution time of the next branch instruction, and for predicting the result of branch by the branch instruction. Therefore, the result of branch by a plurality of branch instructions can be predicted by using only the origin information, the relative position information and the history information as the branch prediction information required for branch prediction. In comparison with the amount of information in the conventional method wherein absolute addresses and history information are stored for each branch instruction, the amount of information in the present embodiment wherein the origin information, the relative position information for each branch instruction and the history information are stored can be reduced, whereby the capacity of the memory for storing the branch prediction information can be made smaller than that required by the conventional method.

Furthermore, in the conventional configuration having a means for storing the address of each branch instruction and for retrieving, at each issue of a branch instruction, a branch instruction corresponding to the issued branch instruction, a retrieval circuit having a plurality of comparators is required to compare the address of the branch instruction with all the stored addresses. However, in the case of the processor of the present invention, the amount of relative position information (relative address values, for example) is less than the amount of address information. Consequently, the comparator and the retrieval circuit can be made smaller in size, and low power consumption can be attained.

BRIEF DESCRIPTION OF THE DRAWINGS

FIG. 5 is a conceptual view showing dynamic branch prediction in accordance with the present invention;

FIG. 6 is a conceptual view showing dynamic branch prediction in accordance with the present invention;

FIG. 8 is a conceptual view showing dynamic branch prediction in accordance with a conventional method.

DETAILED DESCRIPTION OF THE INVENTION

A branch prediction method and a processor in accordance with an embodiment of the present invention will be described below in detail referring to FIGS. 1 to 5.

Figure 1:
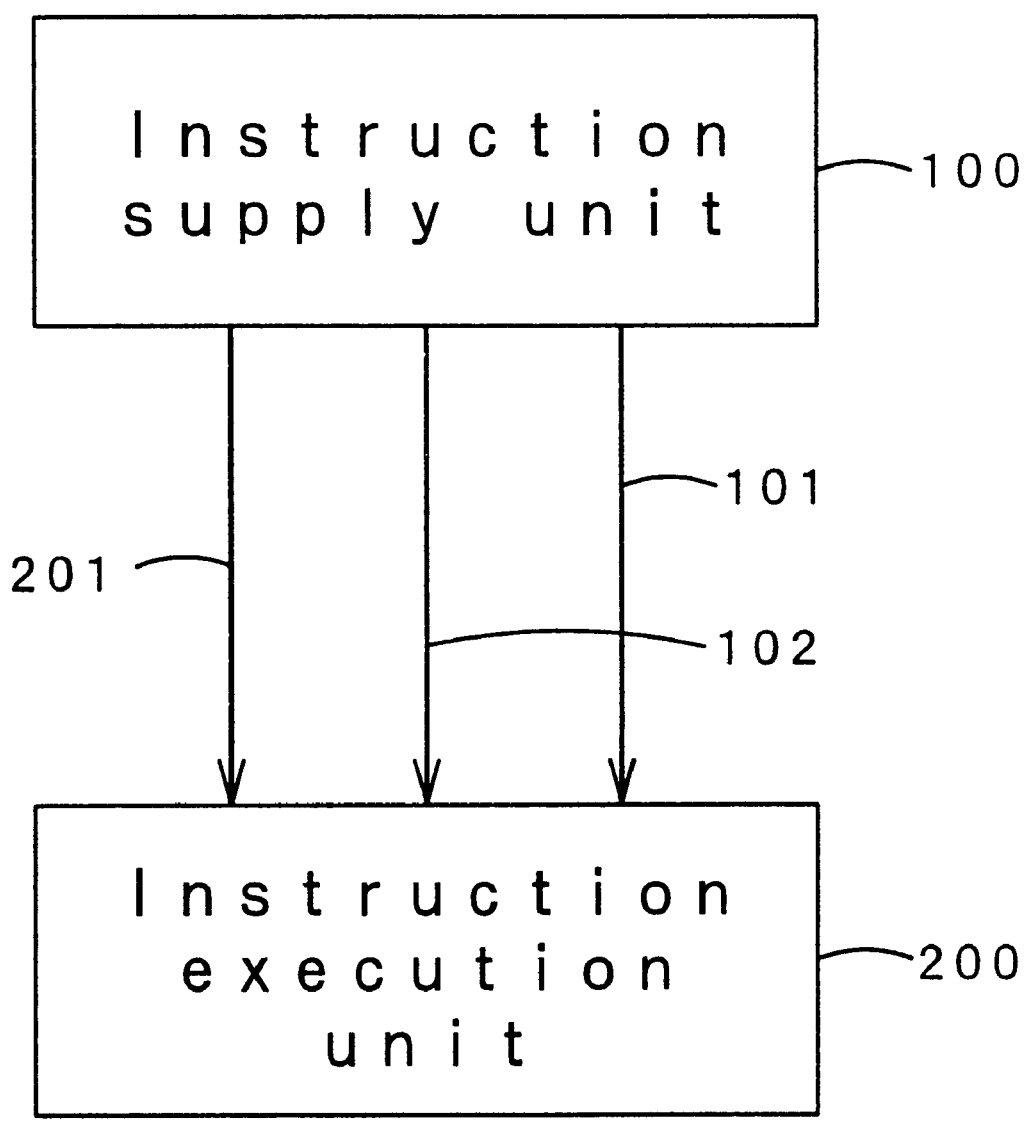
FIG. 1 is a block diagram showing the configuration of a processor in accordance with an embodiment of the present invention.

FIG. 1 is a block diagram showing the hardware configuration of a processor in accordance with the embodiment of the present invention. Roughly speaking, the processor comprises an instruction supply unit 100 and an instruction execution unit 200.

In the present embodiment, the information of the number of branch instructions is taken as an example and shown as relative position information. In the case of the information of the number of branch instructions, the information to be obtained is a continuously increasing value (a value simply increasing in increments of one). Therefore, the information is not required to be stored for retrieval, and can be used directly as an index in which history information has been stored.

The instruction supply unit 100 reads an instruction 101 from an instruction memory in accordance with a program, and supplies the instruction together with the address of the instruction to the instruction execution unit 200. If the instruction supplied to the instruction execution unit 200 is a branch instruction, the instruction supply unit 100 refers to the branch determination result 201 at the instruction execution unit 200, and executes the branch instruction. The instruction execution unit 200 has the functions of an ordinary processor, which are required for executing instructions supplied from the instruction supply unit 100.

Figure 2:
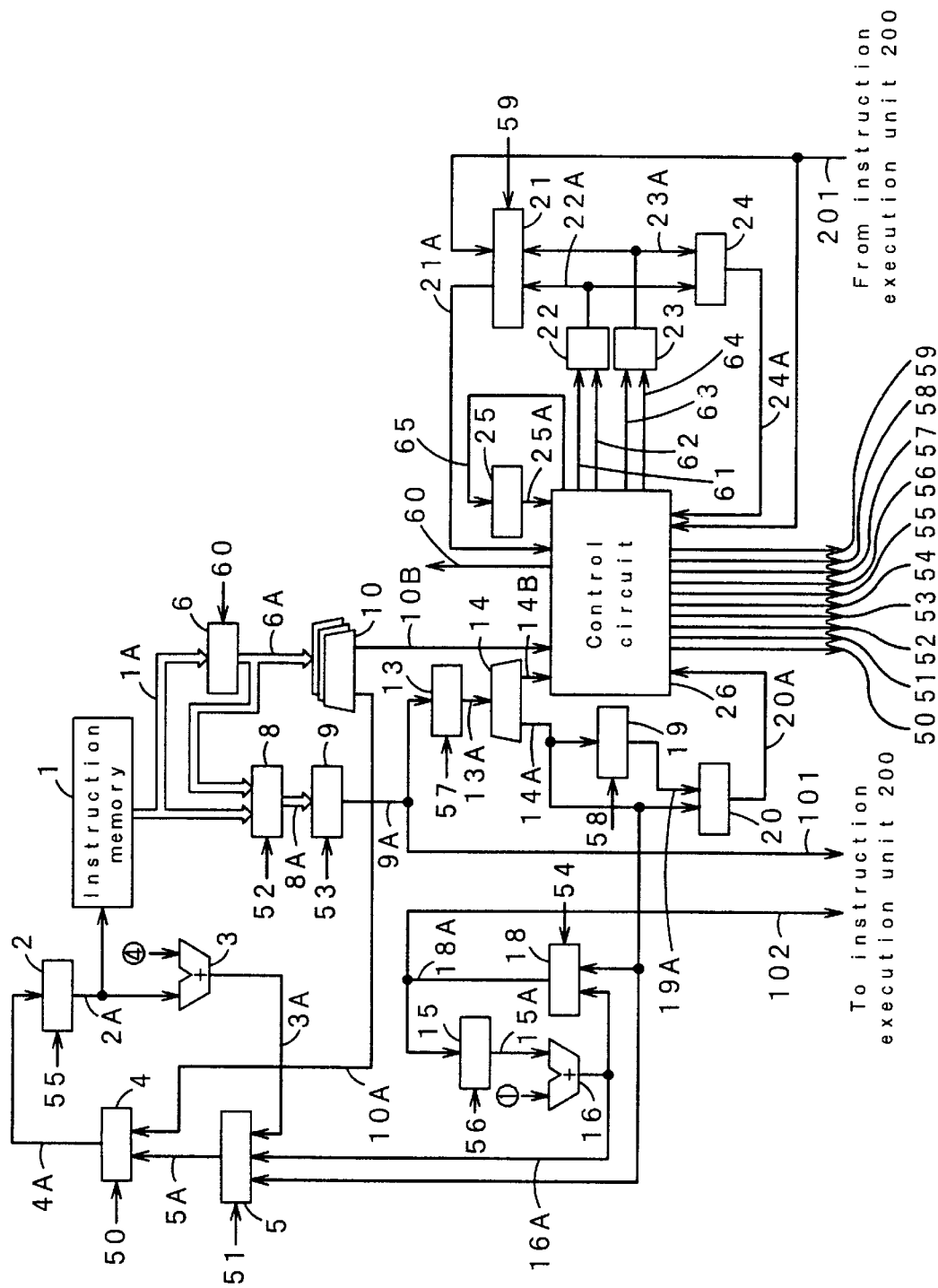
FIG. 2 is a block diagram showing the configuration of the instruction supply unit of the processor in accordance with the embodiment of the present invention.

FIG. 2 is a more detailed block diagram showing the instruction supply unit 100 shown in FIG. 1. The configurations of blocks shown in FIG. 2 will be described below.

An instruction memory 1 is used to store instructions. An instruction group 1A comprising four instructions for example can be read together as a single unit from the instruction memory 1. In addition, in the present embodiment, it is assumed that the instruction group 1A can be read in one cycle. The instruction group 1A is supplied to an instruction buffer 6 and a multiplexer 8.

A prefetch counter 2 is used to store the output 4A of a multiplexer 4 as an address which is used when an instruction group is read from the instruction memory 1. The prefetch counter 2 is controlled by the control signal 55 of a control circuit 26, and an address 2A is delivered and supplied to the instruction memory 1 and an incrementer 3.

The incrementer 3 is used to renew the data of the prefetch counter 2. The incrementer 3 receives the address 2A delivered from the prefetch counter 2, and renews the count data in increments of four in the case of this example. The output 3A thereof is supplied to a multiplexer 5.

The multiplexers 4, 5 are used to select the data of the prefetch counter 2 for the next cycle, and controlled by the control signals 50, 51 of the control circuit 26, respectively. The multiplexer 5 receives the output 3A of the incrementer 3, a branch destination address 14A used as the output of a decoder 14, and the generated address 16A of the incrementer 16, selects one of them in accordance with the control signal 51, and delivers its output 5A to the multiplexer 4. The multiplexer 4 receives the output 5A of the multiplexer 5 and a preceding branch destination address 10A used as the output of a pre-decoder 10, selects one of them in accordance with the control signal 50, and delivers its output 4A to the prefetch counter 2.

The prefetch counter 2, the incrementer 3, and the multiplexers 4, 5 operate as a means for generating an address when an instruction group is read from the instruction memory 1 so as to be pre-decoded.

The instruction buffer 6 is used to store the instruction group 1A read from the instruction memory 1, and is controlled by the control signal 60 of the control circuit 26. An instruction group 6A delivered from the instruction buffer 6 is supplied to the multiplexer 8 and the pre-decoder 10.

The multiplexer 8 receives the instruction group 1A read from the instruction memory 1 and the instruction group 6A stored and delivered by the instruction buffer 6, selects one of them in accordance with the control signal 52 of the control circuit 26, and delivers its output, that is, an instruction group 8A to a multiplexer 9.

The multiplexer 9 selects an instruction from the instruction group 8A comprising four instructions selected and delivered by the multiplexer 8. In other words, the multiplexer 9 selects one of the instructions, that is, an instruction 9A in accordance with the control signal 53 of the control circuit 26, and delivers the instruction to an instruction register 13 and the instruction execution unit 200 as an execution instruction 101.

The instruction buffer 6, the multiplexer 8 and the multiplexer 9 operate as a means for temporarily storing an instruction group so that instructions are pre-decoded, and also operates as a means for supplying instructions to the instruction execution unit 200 and the instruction register 13 so that the instructions are executed.

The pre-decoder 10 is used to decode the instruction group 6A stored in and delivered from the instruction buffer 6 to determine whether an instruction is a backward branch instruction or a forward branch instruction and to generate the preceding branch destination address 10A. The pre-decoder 10 operates as a pre-decoding means for pre-decoding an instruction before execution. A branch determination result 10B by the pre-decoder 10 is supplied to the control circuit 26, and the preceding branch destination address 10A is supplied to the multiplexer 4.

The instruction register 13 receives the instruction 9A delivered from the multiplexer 9, and stores an instruction to be decoded for execution of a branch instruction. It is controlled in accordance with the control signal 57 of the control circuit 26. The output 13A of the instruction register 13 is supplied to the decoder 14.

The decoder 14 is used to perform decoding to determine whether the instruction is a forward branch instruction or background branch instruction. The decoder 14 supplies a signal 14B indicating that the instruction is a branch instruction, and generates the branch destination address 14A at the same time. Furthermore, the decoder 14 supplies the address 14A to the multiplexers 5, 18, a loop address register 19 and a comparator 20, whereby the decoder 14 operates as a decoding means for decoding the instruction for execution. In addition, the decoder 14 carries out decoding to determine that the instruction is a branch instruction, and detects that the branch instruction is a backward branch instruction in accordance with its branch destination address, whereby the decoder 14 operates as a loop detection means for detecting the loop structure of the program. The branch destination address obtained at that time becomes a loop head address.

A program counter 15 receives the output 18A of the multiplexer 18 and stores the address corresponding to the instruction stored in the instruction register 13. The program counter 15 is controlled by the control signal 56 of the control circuit 26. The address 15A delivered from the program counter 15 is supplied to the incrementer 16.

The incrementer 16 is used to renew the data of the program counter 15. It receives the address 15A delivered from the program counter 15 and renews the data in increments of one, thereby to generate the address of the next instructions. The generated address 16A is supplied to the multiplexers 5, 18.

The multiplexer 18 receives the generated address 16A of the incrementer 16 and the branch destination address 14A delivered from the decoder 14. When the instruction is determined to be a branch instruction by the decoder 14, the multiplexer 18 selects the branch destination address 14A delivered from the decoder 14, whereby the data of the program counter 15 is renewed. The multiplexer 18 is controlled by the control signal 54 of the control circuit 26. When the instruction is not a branch instruction, the multiplexer 18 selects the generated address 16A of the incrementer 16.

The loop address register 19 operates as an origin position storing means for storing the position of the instruction located at the origin, for example, the address of the instruction located at the origin, or as a loop head address storing means for fetching and storing the loop head address. The loop address register 19 receives the branch destination address 14A delivered from the decoder 14, and controlled by the control signal 58 of the control circuit 26. A loop head address 19A delivered from the loop address register 19 is supplied to a comparator 20.

The comparator 20 operates as a means for comparing the branch destination address of the decoded branch instruction with the loop head address having been stored, and detecting the second and subsequent loops. The comparator 20 receives the branch destination address 14A delivered from the decoder 14 and the loop head address 19A delivered from the loop address register 19. When the two addresses coincide with each other, the comparator 20 generates a coincidence signal 20A and supplies this signal to the control circuit 26.

A history bit stream 21 is controlled by the control signal 59 of the control circuit 26, and operates to store the result of branch by branch instructions existing at the loop head address and subsequent addresses as one-bit history data.

The branch determination result 201 is supplied as history information from the instruction execution unit 200 to the history bit stream 21. In addition, history information 21A having been stored is supplied to the control circuit 26. A configuration capable of storing 4-bit history information is shown as an example in the present embodiment. However, instead of 4-bit information, 512-bit information for example can be used in the same way.

A read pointer 22 is used to indicate a bit position when one bit is read from the history bit stream 21, and operates as a preceding instruction position obtaining means for obtaining the relative position of a pre-decoded instruction on the basis of the instruction position stored by the origin position storing means. More specifically, this preceding instruction position obtaining means is a means for obtaining the number of instructions by counting the number of instructions having been determined to be branch instructions by pre-decoding. The output 22A of the read pointer 22 is supplied to the history bit stream 21 and a comparator 24. In addition, the reset and renewal of the read pointer 22 are controlled by the control signals 61, 62 of the control circuit 26, respectively.

A write pointer 23 is used to indicate a bit position when one bit is written to the history bit stream 21, and operates as an instruction position obtaining means for obtaining the relative position of the instruction decoded for execution on the basis of the instruction position stored by the origin position storing means. More specifically, this instruction position obtaining means is a means for obtaining the number of instructions by counting the number of instructions having been determined to be branch instructions by decoding for execution. The output 23A of the write pointer 23 is supplied to the history bit stream 21 and the comparator 24. In addition, the reset and renewal of the write pointer 23 are controlled by the control signals 63, 64 of the control circuit 26, respectively.

The comparator 24 is used to detect coincidence between the value of the output 22A of the read pointer 22 and the value of the output 23A of the write pointer 23. It is used to indicate that there is no more history information about branch instructions in the history bit stream 21. When a decoded instruction is determined to be a branch instruction, the history bit stream 21 and the write pointer 23 operate as a history recording means for recording the result of branch by the branch instruction as history information in correspondence with the relative position of the branch instruction. When a pre-decoded instruction is determined to be a branch instruction, the history bit stream 21, the read pointer 22, and the comparator 24 operate as a history reference means for referring to history information corresponding to the relative position of the pre-decoded branch instruction and also operate as a branch prediction means for predicting the result of branch by the pre-decoded branch instruction by using the result of the reference to the history information. The output 24A of the comparator 24 is supplied to the control circuit 26.

A state register 25 is used to store the operation state of branch prediction. It receives the control signal 65 of the control circuit 26, and returns its output 25A to the control circuit 26. When no history information has been stored, the state register 25 takes value "S0." When history information has been stored, the state register takes value "S1." When branch prediction is carried out by using the stored history information, the state register 25 takes value "S2."

The control circuit 26 controls the operation of the entire system. As described above, the control circuit 26 makes selections at the multiplexers 4, 5, 8, 9 and 18, controls renewal at the instruction buffer 6, the prefetch counter 2, the program counter 15, the instruction register 13 and the loop address register 19, controls reading and writing of data from and to the history bit stream 21, and controls reset and renewal at the read pointer 22 and the write pointer 23. The branch determination result 201 is supplied from the instruction execution unit 200 to the control circuit 26.

In the processor in accordance with the embodiment of the present invention, the operations of the major components shown in FIG. 2 will be described below.

For pre-decoding, the prefetch counter 2 holds the address which is used when an instruction group is read from the instruction memory 1 before execution. Value "4" is added to the value of the prefetch counter 2 by the incrementer 3, whereby the address for the next cycle is generated. Via the multiplexers 5 and 4, the address is stored in the prefetch counter 2 in the next cycle, and the data of the prefetch counter 2 is renewed.

When an instruction to be executed and having been stored in the instruction register 13 is decoded by the decoder 14, and the instruction is detected to be a branch instruction by which branch is taken, the multiplexer 5 selects the branch destination address 14A delivered from the decoder 14. The incrementer 16 delivers the address of the next instruction of the instruction to be executed and having been stored in the instruction register 13. When the multiplexer 5 selects this address, it is predicted by branch prediction that branch is taken, and the value of the prefetch counter 2 is changed. When branch is not taken after this, the incrementer 16 is used as a pass f or correcting the value of the prefetch counter 2. The incrementer 3 is a pass to be selected when the instruction is not a branch instruction.

When an instruction is pre-decoded by the pre-decoder 10 and it is predicted that the instruction is a branch instruction by which branch is taken, the multiplexer 4 selects the preceding branch destination address 10A delivered from the pre-decoder 10. In the other cases, the output 5A of the multiplexer 5 is selected. When a valid instruction group has been stored in the instruction buffer 6, the value of the prefetch counter 2 is not renewed.

The instruction buffer 6 stores an instruction group read from the instruction memory 1. Each of the instructions of the stored instruction group is decoded, and detection is made to determined whether the instruction is a branch instruction or not. This detection is used to predict the result of branch. In addition, the instruction group stored in the instruction buffer 6 is supplied sequentially to the instruction register 13. When the instruction buffer 6 has no more instructions stored therein, it reads the next instruction group from the instruction memory 1 and stores the instruction group. When an instruction stored in the instruction register 13 is detected to be a branch instruction, and branch is taken in accordance with the branch determination result delivered by the instruction execution unit 200, the instruction group stored in the instruction buffer 6 is made invalid. In the same way, even when it is predicted that an instruction is determined by the pre-decoder 10 to be a branch instruction by which branch is taken, the content of the instruction buffer 6 is made invalid.

The validity of the content of the instruction buffer 6 is described below. The instruction buffer 6 reads in advance and stores an instruction group. If branch prediction has turned out wrong, the instruction group having been read in advance may become invalid. When the instruction group having been read in advance is to be used later, the instruction group is valid.

The multiplexer 8 selects an instruction group including an instruction to be executed next from the output of the instruction memory 1 or from the output of the instruction buffer 6. When the content of the instruction buffer 6 is invalid, its output is not selected. The multiplexer 9 selects the instruction to be executed next from the instruction group selected by the multiplexer 8. The instruction group includes four instructions. One of the instructions is selected by using the two low-order bits of the next cycle's value to be stored in the program counter 15.

The instruction stored in the instruction register 13 is decoded by the decoder 14, and the decoder 14 generates a signal indicating that the instruction is a forward branch instruction, or a signal indicating that the instruction is a backward branch instruction, and a branch destination address. The branch destination address is valid only when forward branch or backward branch is indicated.

The address of the instruction stored in the instruction register 13 is stored in the program counter 15. Value "1" is added to the address at the incrementer 16, and the result of the addition becomes the address of the next instruction via the multiplexer 18. When the instruction decoded by the decoder 14 is a branch instruction, and the branch determination result delivered from the instruction execution unit 200 indicates that branch is taken, the multiplexer 18 selects a branch destination address. Just when the branch destination address is stored in the program counter 15 in the next cycle, the address is delivered to the instruction execution unit 200 as the address 102 of the instruction to be executed. In the instruction execution unit 200, the address of the instruction to be executed is used to execute an instruction which requires an address, that is, a subroutine call instruction, for example.

The control circuit 26 generates various control signals and the next cycle's operation state of the state register 25 on the basis of the signal indicating that the instruction to be executed is a backward branch instruction or a forward branch instruction, the branch determination result delivered from the instruction execution unit 200, the result of the detection of the pre-decoded branch instruction, the operation state of the state register 25, and the branch history information delivered from the history bit stream 21. In addition, the control circuit 26 performs control as the control circuit of the instruction supply unit of a usual processor.

Before the loop head address is detected, the operation state of the state register 25 is "S0." When a backward branch instruction is detected, and the loop head address is stored in the loop address register 19, the operation state becomes "S1." When the operation state is "S1," if a backward branch instruction is detected again, and the branch destination address coincides with the content of the loop address register 19 (in other words, if the same loop is detected), the state becomes "S2."

When the state of the state register 25 is "S0," the content of the loop address register 19 is invalid. If a backward branch instruction is detected by the decoder 14 when the operation state is "S0," the loop address register 19 stores the branch destination address 14A in the next cycle. This address becomes the loop head address, that is, the position of the origin. When the state of the state register 25 is "S1" or "S2," if a backward branch instruction is detected, and the branch destination address 14A coincides with the content of the loop address register 19, the content of the loop address register 19 remains unchanged. If the branch destination address does not coincide with the content of the loop address register 19 regardless of the operation state, a new branch destination address is stored in the loop address register 19, and the operation state of the state register 25 becomes "S1." This state corresponds to a case wherein another loop is detected. Furthermore, when a backward branch instruction is detected, but branch is not taken, the state of the state register becomes "S0," and the content of the loop address register 19 is made invalid.

The value of the write pointer 23 is incremented after the branch result obtained from the instruction execution unit 200 is stored at the bit position indicated by the value of the write pointer 23. The value of the read pointer 22 is incremented after the branch result stored at the bit position of the history bit stream 21, which is indicated by the value of the read pointer 22, is referred to for branch prediction. However, if it is detected by the comparator 24 that the value of the read pointer 22 is equal to or larger than the value of the write pointer 23, the value of the read pointer 22 is not incremented. The value of the write pointer 23 is reset to "0" when the operation state of the state register 25 changes from "S0" to "S1." In addition, the value of the read pointer 22 is reset to "0" when it is detected that the value of the loop address register 19 is equal to the branch destination address generated by the decoder 14.

When the state of the state register 25 is "S1," and a forward branch instruction is detected by the decoder 14, the history bit stream 21 writes the branch determination result delivered from the instruction execution unit 200 at the bit position indicated by the value of the write pointer 23. After this, the value of the write pointer 23 is incremented. By repeating the above operation, the result of the execution of the forward branch instruction is sequentially written beginning with the bit position 0 (the leftmost bit) of the history bit stream 21. When the state of the state register 25 is "S2," and the instruction to be executed next is detected by the pre-decoder 10 to be a forward branch instruction, the result of branch at the bit position indicated by the value of the read pointer 22 is referred to and is used for branch prediction. For example, it is predictable that when the foregoing branch is taken, the branch of this time will be taken, or when the foregoing branch is not taken, the branch of this time will not be taken. However, when it is detected by the comparator 24 that the value of the read pointer 22 is equal to or larger than the value of the write pointer 23, no prediction is carried out. This is because valid history information is not stored at the bit positions having values larger than the value of the write pointers 3.

FIG. 5 conceptually shows a loop head address and the information of the result of the execution of the first, second, third and fourth branch instructions from the head of the loop, in a manner similar to that shown in FIG. 8.

The components of the processor operate as described above. The flow of the entire operation will be described below referring to a time chart shown in FIG. 3 and an example of a program shown in FIG. 4.

Figure 3:
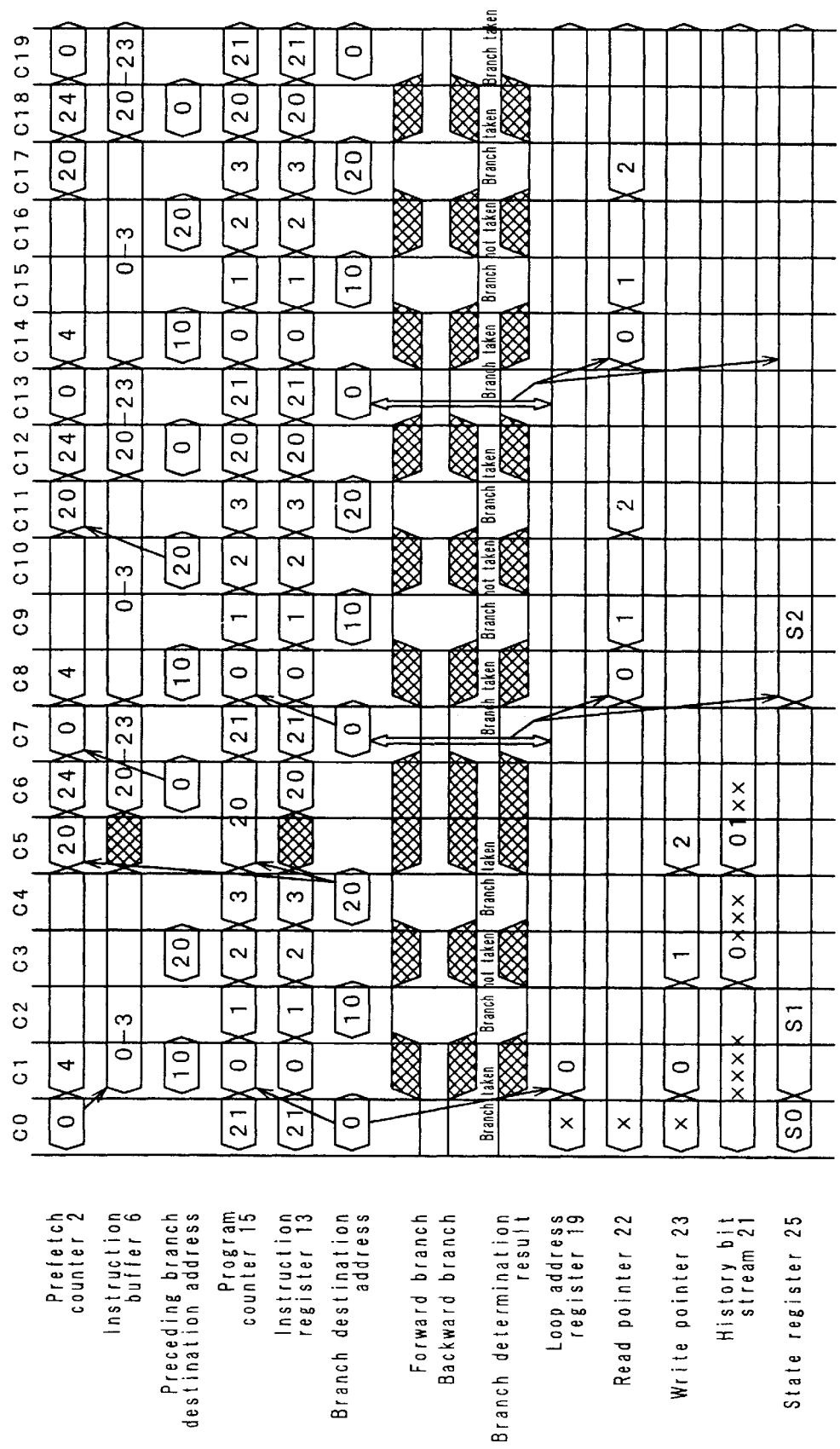
FIG. 3 is a time chart showing the operation of the instruction supply unit of the processor in accordance with the embodiment of the present invention.
Figure 4:
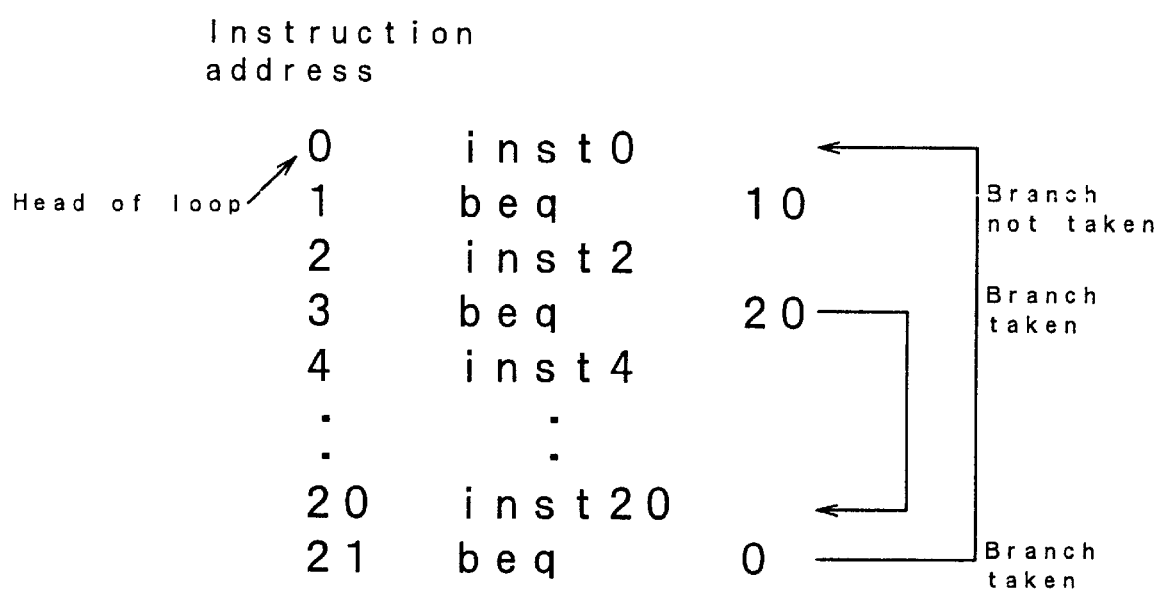
FIG. 4 is a schematic view showing a program example for explaining the operation of the embodiment of the present invention.

FIG. 4 shows a program stored in the instruction memory 1. FIG. 3 is a time chart obtained when the program shown in FIG. 4 is sequentially executed beginning with address 0. The values of various signals are shown in each of cycles C0 to C19. In FIG. 4, "beq TA" is a conditional branch instruction, and TA is a branch destination address. "inst0," "inst2," "inst4" and "inst20" are instructions other than branch instructions, and executed by the instruction execution unit 200. The program shown in FIG. 4 has a loop structure, and includes three branch instructions, that is, beq instructions, in the loop. In the example shown in FIG. 4, branch is not taken by the forward branch instruction located at address 1, forward branch is taken by the forward branch instruction located at address 3, and backward branch is taken by the branch instruction located at address 21.

In the present embodiment, it is assumed that branch prediction for backward branch is carried out by static branch prediction, and it is predicted that branch is taken at all times. In addition, it is assumed that the branch prediction in accordance with the present invention is applied only to forward branch instructions.

The operation will be described below referring to FIG. 3. For the sake of simplicity of explanation, it is assumed that cycle C0 in FIG. 3 is the last cycle of the first loop processing of the program shown in FIG. 4, and that cycle C1 is the first cycle of the second processing. In other words, at cycle C0, just when the branch instruction is executed at the end of the loop, the loop head address obtained by pre-decoding is stored in the prefetch counter 2.

Cycle C0

The "beq 0" instruction located at the end of the loop, that is, at address 21, is stored in the instruction register 13. The decoder 14 generates a signal indicating that the instruction is a backward branch instruction and also generates a branch destination address. The value of the prefetch counter 2 is address 0, that is, a branch destination address. An instruction group corresponding to address 0 is read from the instruction memory 1. The instruction group includes instructions located at addresses 0 to 3. The instructions of the group are hereinafter simply referred to as instructions 0 to 3.

Cycle C1

Since branch is taken in accordance with the detection of the backward branch instruction by the decoder 14 and the branch determination result by the instruction execution unit 200, the state of the state register 25 is "S1." Consequently, the branch destination address is stored in the loop address register 19, and the write pointer 23 is reset to "0." In addition, the group of instructions 0 to 3 read from the instruction memory 1 is stored in the instruction buffer 6. Instruction "inst 0" corresponding to address 0 (hereinafter simply referred to as instruction 0) is stored in the instruction register 13 and is sent to the instruction execution unit 200 at the same time. "4" is added to the value of the prefetch counter 2, and the result of the addition is stored in the prefetch counter 2 via the multiplexers 5, 4. The pre-decoder 10 pre-decodes instruction 1 to be executed after the instruction being executed, that is, the instruction located at address 1 to determine whether the instruction is a branch instruction or not. Although the instruction is found to be a forward branch instruction at this time, since the value of the state register 25 is "S1," branch prediction is not carried out. In other words, the operation carried out at this time is the same as that carried out when it is predicted that branch is not taken. In this case, the pre-decoded information is ignored.

Cycle C2

Instruction 1, that is, "beq 10" is stored in the instruction register 13, and the decoder 14 determines whether the instruction is a branch instruction or not. Since instruction 1 is a branch instruction to address 10, that is, a forward branch instruction, the decoder 14 delivers branch destination address 10. Instruction 1 is also transferred to the instruction execution unit 200, and the instruction execution unit 200 delivers a branch determination result. In this case, the instruction execution unit 200 delivers "branch not taken."

Cycle C3

Since the state of the state register 25 is "S1," the branch determination result delivered by the instruction execution unit 200 is written at the bit position of the history bit stream 21, which is indicated by the value of the write pointer 23. Since the value of the write pointer 23 is "0" at this time, "0" indicating that branch is not taken is written at the position of bit 0, that is, the leftmost position. x represents an uncertain value. After this, the value of the write pointer 23 is incremented to "1."

Instruction 2, that is, "inst2" is stored in the instruction register 13, and is transferred to the instruction execution unit 200. The pre-decoder 10 pre-decodes the next instruction to determine whether the instruction is a branch instruction or not. Although it is found that the instruction is a forward branch instruction at this time, since the state of the state register 25 is "S1," branch prediction is not carried out. In other words, the operation carried out at this time is the same as that carried out when it is predicted that branch is not taken. In this case, the pre-decoded information is ignored.

Cycle C4

Instruction 3, that is, "beq 20" is stored in the instruction register 13, and the decoder 14 determines whether the instruction is a branch instruction or not. Since instruction 3 is a branch instruction to address 20, that is, a forward branch instruction, the decoder 14 delivers branch destination address 20. The instruction 3 is also transferred to the instruction execution unit 200, and the instruction execution unit 200 delivers a branch determination result. In this case, the instruction execution unit 200 delivers "branch taken."

Cycle C5

Since the state of the state register 25 is "S1," the branch determination result is written at the bit position of the history bit stream 21, which is indicated by the value of the write pointer 23. Since the value of the write pointer 23 is "1" at this time, "1" indicating that branch is not taken is written at the position of bit 1, that is, the second position from the left. After this, the value of the write pointer 23 is incremented to "2."

Although branch is taken at cycle C4, since the instruction at the branch destination has not yet been read from the instruction memory 1, no instruction is executed in this cycle. The prefetch counter 2 stores the branch destination address 20 selected by the multiplexer 5 so as to be used to read instructions from the instruction memory 1.

Cycle C5 is a penalty cycle generated when branch is taken by the forward branch instruction at address 3. When branch is not taken by a forward branch instruction, no penalty is generated, since the prefetched subsequent instruction is valid. When branch is taken, however, the subsequent instruction is invalid, and no instruction can be executed until a valid instruction is read from the instruction memory 1 by using a branch destination address. This penalty cycle lowers the performance of the processor.

Cycle C6

Instruction 20 is stored in the instruction register 13. The pre-decoder 10 decodes instruction 21 and the instruction is found to be a backward branch instruction. In the case of the backward branch instruction, it is predicted by hardware in a fixed manner that branch is carried out. Therefore, the pre-decoder 10 delivers address 0, that is, a branch destination address, and the address is transferred to the prefetch counter 2 via the multiplexer 4.

Cycle C7

Address 0 is stored in the prefetch counter 2, and the instruction located at address 21 is stored in the instruction register 13 and executed. When the instruction is detected to be a backward branch instruction by the decoder 14, the branch destination address is compared with the value of the loop address register 19 by the comparator 20. If the two coincide with each other as the result of comparison, it is determined that the same loop as that executed the last time is executed. In this case, the state of the state register 25 is set to "S2," and the value of the read pointer 22 is set to "0". From the instruction execution unit 200, branch taken is delivered as the branch determination result, and branch is carried out.

Cycle C8

The branch destination address 0 obtained in cycle C7 is stored in the program counter 15. On the other hand, instruction 0 read from the instruction memory 1 in cycle C7 is stored in the instruction register 13. At this time, no penalty cycle is generated, because branch is predicted for the backward branch instruction.

Since the state of the state register 25 is "S2," the pre-decoder 10 pre-decodes the next instruction, that is, instruction 1. Since it is found as the result of pre-decoding that the instruction is "beq 10", that is, a forward branch instruction, the value of the bit position of the history bit stream 21, which is indicated by the value of the read pointer 22, is referred to. If the value is "0," it is predicted that branch is not taken. If the value is "1," it is predicted that branch is taken. Since the value of the read pointer 22 is "0" at this time, bit 0, that is, the leftmost bit is referred to. Since the value at the leftmost bit is "0," it is predicted that branch is not taken. When branch is not taken by branch prediction, the same operation as that carried out when no branch instruction is present is carried out. The value of the read pointer 22 is incremented to "1."

Cycle C9

Instruction 1, that is, "beq 10" is stored in the instruction register 13, and the decoder 14 determines whether the instruction is a branch instruction or not. Since instruction 1 is a branch instruction to the address 10, that is, a forward branch instruction, the decoder 14 delivers the branch destination address 10. The instruction 1 is also transferred to the instruction execution unit 200, and the instruction execution unit 200 delivers the branch determination result. In this case, branch not taken is delivered.

Cycle C10

Instruction 2, that is, "inst2" is stored in the instruction register 13, and the instruction is transferred to the instruction execution unit 200. The pre-decoder 10 pre-decodes instruction 3 to determine whether the instruction is a branch instruction or not. Since it is found that the instruction is a forward branch instruction, that is, "beq 20" at this time, and the state of the state register 25 is "S2," branch prediction is carried out. In other words, the value of the bit position of the history bit stream 21, which is indicated by the value of the read pointer 22, is referred to. Since the value of the read pointer 22 is "1" at this time, bit 1, that is, the second bit from the left is referred to. Since the value referred to is "1," it is predicted that branch is taken. Consequently, the prefetch counter 2 stores the branch destination address delivered from the pre-decoder 10, that is, address 20. The value of the read pointer 22 is incremented to "2".

Cycle C11

Instruction 3, that is, "beq 20" is stored in the instruction register 13, and the decoder 14 delivers the branch destination address 20 of the branch instruction. Instruction 1 is also transferred to the instruction execution unit 200, and the instruction execution unit 200 delivers the branch determination result. At this time, branch not taken is delivered.

Cycle C12

In this cycle, it is supposed that a penalty is generated, since branch has been taken by the forward branch instruction in cycle C11. However, since branch prediction has been carried out in cycle C11, no penalty is generated.

Address 20 is stored in the program counter 15, and the instruction located at address 20 is stored in the instruction register 13. Since it is predicted that branch is taken for the group of instructions 20 to 23 located at address 20 in cycle C10, the group of instructions is read in advance from the instruction memory 1 in cycle C11. The group of instructions 20 to 23 is stored in the instruction buffer 6. The pre-decoder 10 can pre-decode the instruction located at address 21. By the decoding, it is found that the instruction is a backward branch instruction. Since it is predicted that branch is taken at all times in the case of backward branch, the prefetch counter 2 stores the branch destination address delivered from the pre-decoder 10, that is, address 0.

Cycle C13

When address 0 is stored in the prefetch counter 2, the instruction located at address 21 is stored in the instruction register 13 and executed. When the instruction is detected to be a backward branch instruction by the decoder 14, the branch destination address is compared with the value of the loop address register 19 by the comparator 20. If the two coincide with each other, it is confirmed that the same loop as that executed the last time is executed. In this case, the state of the state register 25 is set to "S2," and the value of the read pointer 22 is set to "0." From the instruction execution unit 200, branch taken is delivered as the branch determination result, and branch is carried out.

In cycle 14 and the subsequent cycles, the operations in cycles C8 to C13 are repeated until the loop ends.

When the state of the state register 25 is "S1" in the above description, in other words, in cycles C1 to C7, a first step is executed wherein the result of branch by a branch instruction is recorded as history information in correspondence with the relative position of the branch instruction from the origin. Furthermore, when the state of the state register 25 is "S2," in other words, in cycle C8 and the subsequent cycles, a second step is executed wherein the result of branch by the above-mentioned next branch instruction is predicted by referring to the above-mentioned history information on the basis of the relative position of the pre-decoded instruction from the origin at the time of pre-decoding before the execution of the next branch instruction. A first means is used to execute the first step, and a second means is used to execute the second step.

The operations described above are carried out when branch prediction has turned out right. However, branch prediction may turn out wrong. The operations described below are carried out when branch prediction has turned out wrong.

(1) In the case that branch not taken is predicted by branch prediction but branch is taken.

When branch not taken is predicted by branch prediction, the same operation as that carried out when the pre-decoder 10 did not detect any branch instruction is carried out. Therefore, the operation for reading instructions in advance from the instruction memory 1 is not carried out. When it is found thereafter at the instruction execution unit 200 that branch is taken, instructions are read from the instruction memory 1. In this case, a penalty of one cycle is generated.

(2) In the case that branch taken is predicted by branch prediction but branch is not taken.

When branch taken is predicted by branch prediction, the branch destination address delivered from the pre-decoder 10 is stored in the prefetch counter 2, and instructions are read in advance from the instruction memory 1. After this, when it is found at the instruction execution unit 200 that branch is not taken, the next address (the output of the incrementer 16) after the address of the current instruction (branch instruction) stored in the program counter 15 is stored in the prefetch counter 2 via the multiplexers 5, 4. The instructions subsequent to the branch instruction are read from the instruction memory 1. In this case, a penalty of one cycle is generated.

In addition, when branch is not taken (the loop is ended) after backward branch is detected, the state of the state register 25 is set to "S0." Furthermore, when a backward branch instruction is executed, the branch destination address is compared with the content of the loop address register 19 by the comparator 20. If the two does not coincide with each other, the state of the state register 25 is set to "S1." This operation is carried out when a different loop is detected in the loop. In order to deal with this kind of case, a plurality of sets, each comprising a loop address register 19, a history bit stream 59, a read pointer 22, a write pointer 23, a comparator 20 and a comparator 24, are provided, and branch prediction is carried out for each loop by using the history bit stream 59, the read pointer 22, the write pointer 23, the comparator 20 and the comparator 24 of the set including the loop address register 19 having a content being coincident with the branch destination address. With this configuration, the hit rate of the prediction in accordance with the present invention can be raised.

As described above, in accordance with the embodiment of the present invention, the result of branch by branch instructions is recorded as history information in correspondence with the number of branch instructions executed from the loop head address. When the next branch instruction is executed, the result of branch by the branch instruction is predicted by referring to the history information on the basis of the number of the pre-decoded branch instructions from the origin. Therefore, by using only the loop head address and the data of the history bit stream as branch prediction information required for branch prediction, it is possible to predict the result of branch by a plurality of branch instructions. In comparison with the amount of information in the case of the conventional example wherein the absolute address and history information are stored for each branch instruction, the amount of information is made smaller, since only the loop head address and the data of the history bit stream are stored. Therefore, the capacity of the memory for storing branch prediction information can be made smaller than that of the conventional method. In addition, unlike the conventional method, storing the address of each branch instruction, and retrieving stored branch instructions corresponding to issued branch instructions at each issue of a branch instruction are not necessary. Therefore, no retrieval circuit is required, and the size of the circuit can be made smaller. In addition, low power consumption can be attained.

For example, in a processor for carrying out branch prediction in accordance with the conventional method, when 32 address bits and 1 history information bit are used as one entry, a storage element having 512 or 1024 entries is required.

In the case of 512 entries, $$(32+1) \times 512$$

that is, storage elements amounting to 33-times 512 are required. In the case of the present invention, since an address corresponding to each history information bit is not necessary, only one bit is used for one entry. However, storage elements are required to store the address of the origin and to implement a read pointer and a write pointer. Thirty-two bits are used for the address. When the read pointer and the write pointer deal with 512 history information bits, 9 bits are required for each pointer. Therefore, in the case of 512 entries, $$(0+1) \times 512 + (32+9+9)$$

that is, storage elements amounting to 2-times 512 are required at most.

Furthermore, in the retrieval circuit of a processor for carrying out the conventional branch prediction, 512 32-bit comparators are required to quickly retrieve an address corresponding to the address of the pre-decoded branch instruction from among 512 32-bit addresses. In the case of the present invention, however, only the comparator 20 (a 32-bit comparator) and the comparator 24 (a 9-bit comparator) are used. Therefore, the size of the circuit can be reduced significantly.

In the embodiment of the present invention, the first branch result of a loop is stored and used for branch prediction for the rest of the loop. However, after history information is renewed in accordance with the result of branch in each loop, prediction may be carried out in accordance with the result of the branch in the previous loop. Furthermore, the history information of the result of branch is represented by one bit. However, the history information may be represented by two or more bits so that branch prediction can be carried out by using the result of two or more times of past branch for one branch instruction. In other words, plural pieces of history information may be provided, and branch prediction may be carried out on the basis of the plural pieces of history information. In this case, if branch was taken two times in the past, it is predicted that branch is taken this time. If branch taken was carried out one time and branch not taken was carried out one time in the past, it is assumed that branch taken and branch not taken are repeated alternatively, and branch taken may be predicted this time.

In addition, if branch prediction has turned out wrong, the subsequent branch prediction may not be carried out. In the case of wrong prediction, it is possible to improve accuracy by providing another history bit stream.

Furthermore, in the embodiment of the present invention, the number of forward branch instructions is counted and used for indexing. However, the same effect can be obtained by using the number of any given instructions.

Moreover, as shown in the conceptual view shown in FIG. 6, the same effect can be obtained by storing the difference in address from the loop head address and by retrieving the difference in address. In other words, when storing the different in address, and it is assumed that a loop structure in a program with 32-bit addresses has up to 255 addresses, for example, the number of bits for storing the difference (relative address value) may be eight. This is because the number of bits can be reduced to ¼ in comparison with the number required when absolute addresses are stored. In this case, the instruction position obtaining means comprises a means for obtaining the difference between the address of an instruction decoded for execution and the address stored by the origin position storing means. In correspondence with this, the preceding instruction position obtaining means comprises a means for obtaining the difference between the address of the pre-decoded instruction and the address stored by the origin position storing means.

Furthermore, instead of a single pass, a plurality of passes can be provided for history information, whereby accuracy can be improved. (Tree-structure history bit stream) Accuracy can be improved further by feeding back the result of execution after prediction. Tree-structure history bit stream will be described below. The bit stream mentioned herein represents a flow of the result of branch. When a stream has four bits, and when o represents branch taken and x represents branch not taken for example, o x o o the stream is indicated as shown above. When prediction is carried out in accordance with this stream, branch is taken first, and branch is not taken next. If the first branch is not taken at this time, the reliability of the subsequent branch history information is reduced considerably. This can be explained as follows. Since branch is not taken, the flow of instructions may be changed, and different branch instructions may be applied. To solve this problem, bit streams are provided as shown below:

| (1) | (2) | (3) | (4) |
|-----|-----|-----|-----|
| o   |     |     |     |
| x   | o   |     |     |
| o   | x   | o   |     |
| o   | x   | x   | o   |

Stream (1) is the same as that shown above. Stream (2) is an alternate stream to be used when the prediction for the first branch instruction has turned out wrong. The subsequent streams (3) and (4) are also alternate streams to be used when predictions corresponding thereto respectively have turned out wrong. This structure is referred to as a tree structure.

In addition, although the number of branch instructions is counted and used for indexing, the same effect can be obtained even when the number of bytes from the loop head address is used.

Furthermore, although the number of branch instructions is counted in the above-mentioned embodiment, the number of all instructions to be executed may be counted and used for indexing, whereby the result information of branch instructions may be stored at the positions corresponding to the branch instructions. In this case, the instruction position obtaining means comprises a means for obtaining the number of instructions by counting the instructions decoded for execution. In correspondence with this, the preceding instruction position obtaining means comprises a means for obtaining the number of instructions by counting pre-decoded instructions.

Furthermore, although the position of the origin is set at the head address of a loop in the above-mentioned embodiment, the position is not limited to the head address of the loop. For example, a program may be divided into program blocks each having 64 bytes, and the position of the origin may be set at the head address of each program block. In this case, the origin position storing means comprises a block head address detection means for detecting the head address of the program block, and a block head address storing means foe storing the address detected by the block head address detection means.

The branch prediction method carried out by using the branch prediction device in the above-mentioned processor will be described below referring to the flowchart shown in FIG. 7. This branch prediction method comprises a first step wherein the result of branch by a branch instruction is recorded as history information in correspondence with the relative position of the instruction from an origin, and a second step wherein the result of branch by the next branch instruction is predicted by referring to the history information on the basis of the relative position of a pre-decoded instruction from the origin when the next branch instruction is pre-decoded before execution. The above-mentioned first step is carried out when the state of the state register 25 is "S1," that is, at cycles C1 to C7 in the time chart shown in FIG. 3. In addition, the second step is carried out when the state of the state register 25 is "S2," that is, at cycle C8 and the subsequent cycles in FIG. 3.

Figure 7:
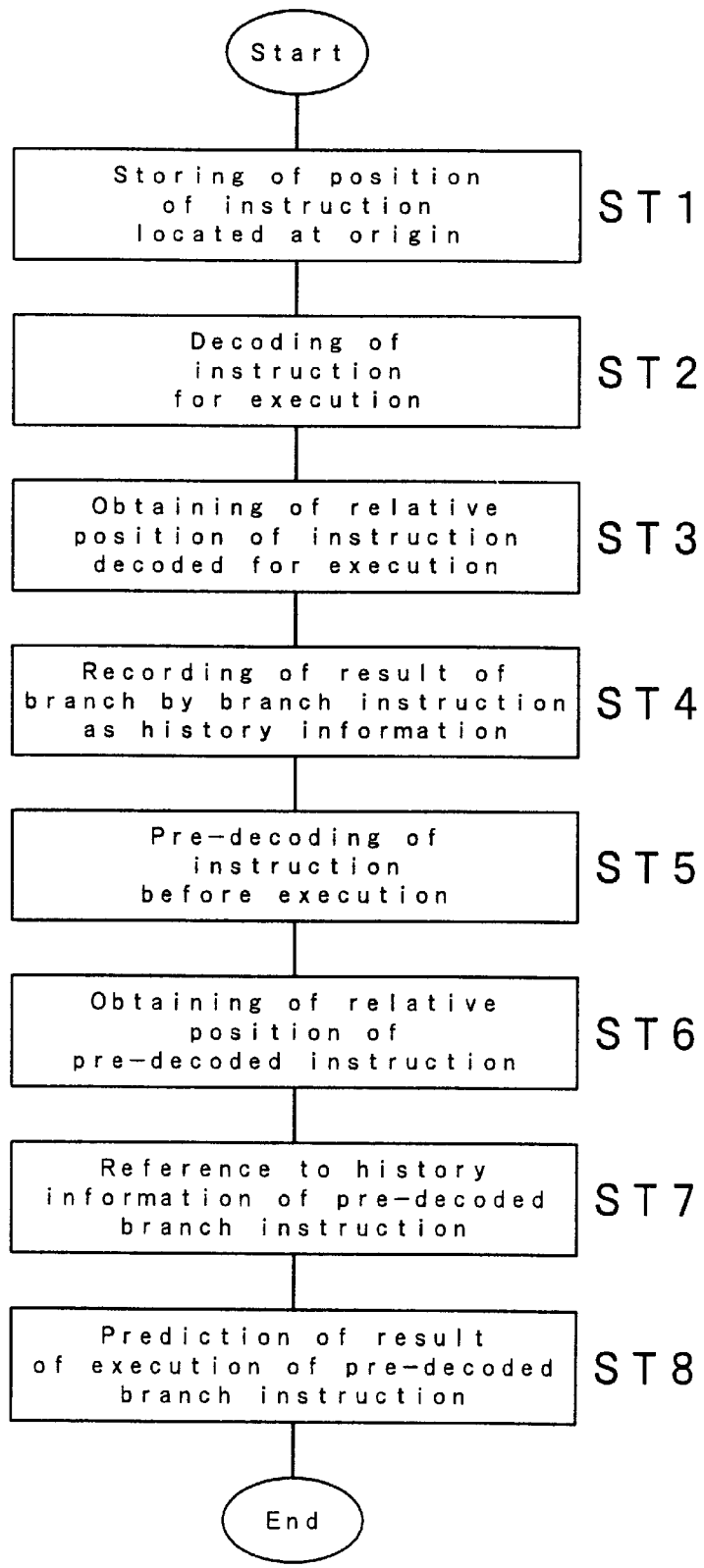
FIG. 7 is a flowchart showing a branch prediction method in accordance with the embodiment of the present invention.

In this case, as shown in FIG. 7, the above-mentioned first step further comprises an origin position storing step ST1 for storing the position of the instruction located at the origin, an execution decoding step ST2 for decoding an instruction for execution, an instruction position obtaining step ST3 for obtaining the relative position of the instruction decoded for execution on the basis of the position of the instruction stored by the origin position storing step, and a history recording step ST4 for recording the result of branch by the branch instruction as history information in correspondence with the relative position of the branch instruction when the decoded instruction is a branch instruction. The origin position storing step ST1 is executed by the origin position storing means, the execution decoding step ST2 is executed by the execution decoding means, the instruction position obtaining step ST3 is executed by the instruction position obtaining means, and the history recording step ST4 is executed by the history recording means.

Furthermore, as also shown in FIG. 7, the second step further comprises a pre-decoding step ST5 for pre-decoding the instruction before the instruction is executed next time, a preceding instruction position obtaining step ST6 for obtaining the relative position of the pre-decoded instruction on the basis of the position of the instruction stored by the origin position storing means, a history reference step ST7 for referring to the history information corresponding to the relative position of the pre-decoded branch instruction when the pre-decoded instruction is a branch instruction, and a prediction step ST8 for predicting the result of the execution of the pre-decoded branch instruction by using the result of the reference to the history information. The pre-decoding step ST5 is executed by the pre-decoding means, the preceding instruction position obtaining step ST6 is executed by the preceding instruction position obtaining means, the history reference step ST7 is executed by the history reference means, and the prediction step ST8 is executed by the branch prediction means.

Furthermore, the above-mentioned origin position storing step ST1 is a step for storing the address of the instruction to be executed, which is located at the origin, for example. More specifically, the origin position storing step ST1 comprises a loop detection step for detecting a loop structure in a program, and a step for fetching and storing the address of the instruction located at the head of the loop on the basis of the loop structure of the program detected by the loop detection step, for example. The above-mentioned loop detection step is a step for detecting the loop structure of the program by decoding a backward branch instruction, for example.

Instead of the above-mentioned configuration, the origin position storing step ST1 may comprise a block head address detection step for detecting the head address of a program block, and a block head address storing step for storing the address detected by the block head address detection step, for example.

The above-mentioned instruction position obtaining step ST3 comprises a step for obtaining the number of instructions by counting the number of the instructions decoded for execution, for example. In correspondence with this, the preceding instruction position obtaining step ST6 comprises a step for obtaining the number of instructions by counting the pre-decoded instructions.

Furthermore, instead of the above-mentioned configuration, the instruction position obtaining step ST3 may comprise a step for obtaining the number of instructions by counting the number of the instructions found to be branch instructions by decoding for execution, for example. In correspondence with this, the preceding instruction position obtaining step ST6 may comprise a step for obtaining the number of instructions by counting the instructions found to be branch instructions by pre-decoding.

Furthermore, instead of the above-mentioned configuration, the instruction position obtaining step ST3 may comprise a step for obtaining the difference between the address of the instruction decoded for execution and the address stored by the origin position storing step, for example. In correspondence with this, the preceding instruction position obtaining step ST6 may comprise a step for obtaining the difference between the address of the pre-decoded instruction and the address stored by the origin position storing step.

The above-mentioned history recording step ST4 may be a step for recording plural pieces of history information.

With the above-mentioned branch prediction method, history information is recorded in correspondence with the relative position of a branch instruction from the origin on the basis of the result of branch, and at the execution time of the next branch instruction the history information is referred to on the basis of the relative position of the pre-decoded instruction from the origin to predict the result of branch by the branch instruction. Therefore, the result of branch by a plurality of branch instructions can be predicted by using only the origin information, the relative position information and the history information as the branch prediction information required for branch prediction. In comparison with the amount of information in the conventional method wherein absolute addresses and history information are stored for each branch instruction, the amount of information in the present embodiment wherein the origin information, the relative position information for each branch instruction and the history information are stored can be reduced, whereby the capacity of the memory for storing the branch prediction information can be made smaller than that required by the conventional method.

Furthermore, in the conventional configuration wherein the address of each branch instruction is stored, and at each issue of a branch instruction a branch instruction corresponding to the issued branch instruction is retrieved, a retrieval circuit having a plurality of comparators is required to compare the address of the branch instruction with all the stored addresses. However, in the case of the branch prediction method of the present invention, the amount of relative position information (relative address values, for example) is less than the amount of address information. Consequently, the comparator and the retrieval circuit can be made smaller in size, and low power consumption can be attained.

What is claimed is:

1. A branch prediction method comprising a first step wherein the result of branch by a branch instruction is recorded as history information in correspondence with the relative position of said instruction from an origin, and a second step wherein the result of branch by the next branch instruction is predicted by referring to said history information on the basis of the relative position of a pre-decoded instruction from said origin when said next branch instruction is pre-decoded before execution, wherein:

said first step comprises an origin position storing step for storing the position of said instruction located at said origin, an execution decoding step for decoding an instruction for execution, an instruction position obtaining step for obtaining the relative position of said instruction decoded for execution on the basis of said position of said instruction stored by said origin position storing step, and a history recording step for recording the result of branch by said branch instruction as history information in correspondence with said relative position of said branch instruction when said decoded instruction is a branch instruction, said second step comprises a pre-decoding step for pre-decoding said instruction before said instruction is executed next time, a preceding instruction position obtaining step for obtaining said relative position of said pre-decoded instruction on the basis of said position of said instruction stored by said origin position storing step, a history reference step for referring to said history information corresponding to said relative position of said pre-decoded branch instruction when said instruction is a branch instruction, and a prediction step for predicting the result of the execution of said pre-decoded branch instruction by using the result of said reference to said history information, said instruction position obtaining step comprises a step for obtaining the number of instructions by counting the number of said instructions found to be branch instructions by decoding for execution, and said preceding instruction position obtaining step comprises a step for obtaining the number of instructions by counting said instructions found to be branch instructions by pre-decoding.

2. A processor comprising a first means wherein the result of branch by a branch instruction is recorded as history information in correspondence with the relative position of said instruction from an origin, and a second means wherein the result of branch by the next branch instruction is predicted by referring to said history information on the basis of the relative position of a pre-decoded instruction from said origin when said next branch instruction is pre-decoded before execution, wherein:

said first means comprises an origin position storing means for storing the position of said instruction located at said origin, an execution decoding means for decoding an instruction for execution, an instruction position obtaining means for obtaining the relative position of said instruction decoded for execution on the basis of said position of said instruction stored by said origin position storing means, and a history recording means for recording the result of branch by said branch instruction as history information in correspondence with said relative position of said branch instruction when said decoded instruction is a branch instruction, said second means comprises a pre-decoding means for pre-decoding said instruction before said instruction is executed next time, a preceding instruction position obtaining means for obtaining said relative position of said pre-decoded instruction on the basis of said position of said instruction stored by said origin position storing means, a history reference means for referring to said history information corresponding to said relative position of said pre-decoded branch instruction when said pre-decoded instruction is a branch instruction, and a prediction means for predicting the result of the execution of said pre-decoded branch instruction by using the result of said reference to said history information, wherein, said instruction position obtaining means comprises a means for obtaining the number of instructions by counting the number of said instructions found to be branch instructions by decoding for execution, and said preceding instruction position obtaining means comprises a means for obtaining the number of instructions by counting said instructions found to be branch instructions by pre-decoding.

* * * * *